Dec. 17, 1957 P. W. WADSWORTH 2,816,958

FIRE AND POLICE TELEPHONE REPORTING SYSTEM

Filed April 27, 1956 6 Sheets-Sheet 1

INVENTOR
BY P. W. WADSWORTH
R. O. Covell
ATTORNEY

Dec. 17, 1957 P. W. WADSWORTH 2,816,958

FIRE AND POLICE TELEPHONE REPORTING SYSTEM

Filed April 27, 1956 6 Sheets-Sheet 2

INVENTOR
P. W. WADSWORTH
BY R. O. Covell
ATTORNEY

FIRE AND POLICE TELEPHONE REPORTING SYSTEM

Filed April 27, 1956 6 Sheets-Sheet 3

INVENTOR
P. W. WADSWORTH
BY R. O. Covell
ATTORNEY

Dec. 17, 1957 P. W. WADSWORTH 2,816,958

FIRE AND POLICE TELEPHONE REPORTING SYSTEM

Filed April 27, 1956 6 Sheets-Sheet 4

INVENTOR
P. W. WADSWORTH
BY R. O. Covell
ATTORNEY

FIRE AND POLICE TELEPHONE REPORTING SYSTEM

Filed April 27, 1956 6 Sheets-Sheet 5

INVENTOR
P. W. WADSWORTH
BY R. O. Covell
ATTORNEY

INVENTOR
P. W. WADSWORTH
BY R. O. Covell
ATTORNEY

United States Patent Office 2,816,958

Patented Dec. 17, 1957

2,816,958

FIRE AND POLICE TELEPHONE REPORTING SYSTEM

Paul W. Wadsworth, Garden City, N. Y., assignor to Bell Telephone Laboratories, Incorporated, New York, N. Y., a corporation of New York Application April 27, 1956, Serial No. 581,173

9 Claims. (Cl. 179—5)

This invention relates to emergency reporting telephone systems and particularly to systems for connecting remote emergency reporting stations with fire and police headquarters.

In such telephone systems emergency reporting stations, which are widely scattered throughout an area served by the fire and police departments of a community, are connected through wire or equivalent facilities to fire and police headquarters where verbal messages can be received and relayed to interested units of these departments. Often the fire and police departments have headquarters at different locations as their operations are, in the great part, independent of each other. Speed in the reporting of an emergency is of paramount importance. Therefore, emergency calls should be initially routed to the interested department without incurring the inherent delay in transferring a call from one department to another. Circuits of this type must provide an indication of trouble when they are inoperative either due to failure in the equipment or wire facilities or due to vandalism. Preferably one emergency reporting station should serve both departments at a given location since the provision of separate station equipment in each location not only increases the equipment cost including the required wire facilities but also increases maintenance cost. Such station equipment can adequately serve both departments as only a small amount of traffic is handled from each station.

One object of this invention is to minimize the time required to complete an emergency call to a fire or police headquarters.

A further object of this invention is to provide a system which will give an alarm responsive to an open line condition or equipment failure or vandalism which would render the system inoperative.

Still another object of this invention is to provide the requisite features with a minimum number of circuit components.

In accordance with one feature of this invention a nonlocking key is provided at each emergency reporting station to enable a reporting party to direct the emergency call to the interested department without delay.

In accordance with another feature of this invention failure in an emergency reporting station equipment, wire line failure, or vandalism which would render the system inoperative causes an alarm to be given.

The invention and the features thereof will be understood more fully and clearly from the following detailed description with reference to the accompanying drawings in which.

*General description*

Figures 1, 7:
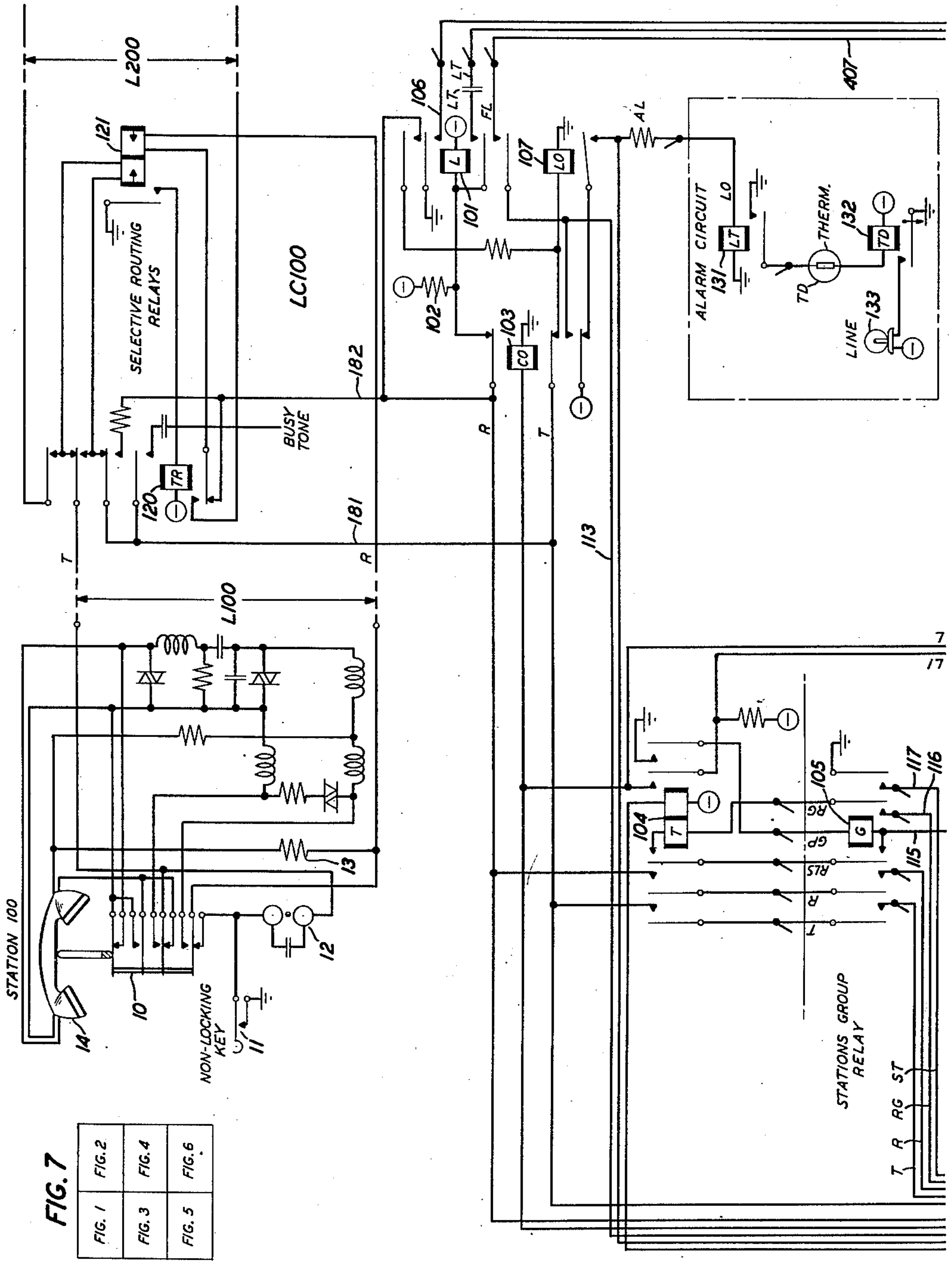
Fig. 1 is a schematic drawing showing a remote emergency reporting station and the station line equipment which is located at fire headquarters.
Fig. 7 shows the arrangement of Figs. 1 through 6 to form an operative system.
Figure 2:
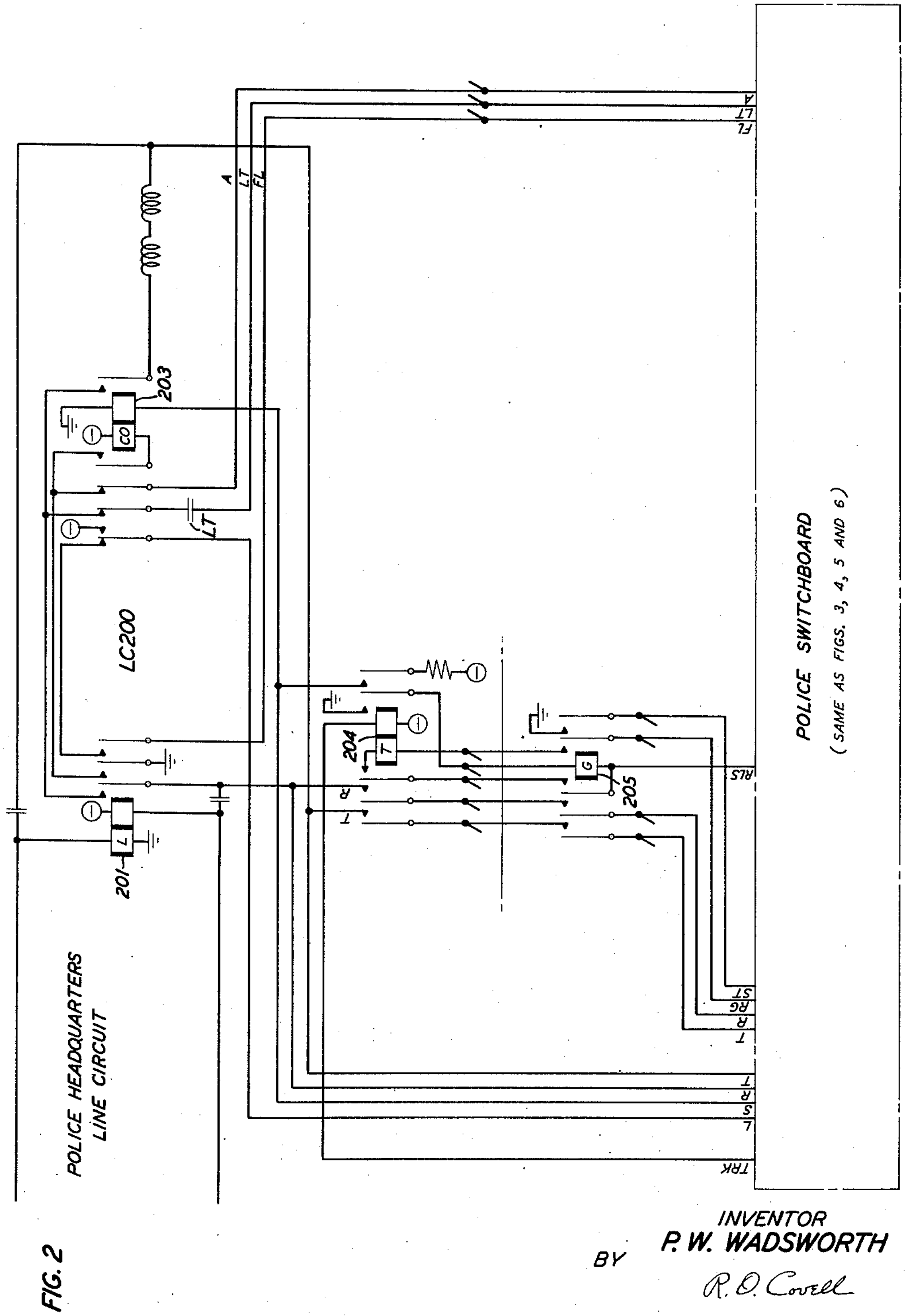
Fig. 2 shows the station line equipment which is located at police headquarters.

Each of the emergency reporting stations, including the station 100, shown in Fig. 1, comprises a telephone handset which normally rests in a cradle switch 10 having contacts through which the telephone set is connected to the conductors of line L100. A ringer 12 is normally connected to be activated from signaling current received over the line. A nonlocking key 11 is provided for use in initiating a call to police headquarters, calls to fire headquarters being initiated merely by removing the handset from the cradle. The station equipment is enclosed in a metal casing, not shown.

The line circuit equipment LC100, shown in Fig. 1, is located at the fire headquarters switchboard and comprises line relays 101 and 107 normally connected in series with the conductors of line L100. Relay 107 is a normally operated alarm relay and relay 101 is a line relay which is operated responsive to initiation of a call. The line equipment further includes a cut-off relay 103, a talking relay 104 individual to line L100 and a group relay 105. A group relay is provided for each group of ten station lines and for each group of ten trunk circuits. The line circuit equipment LC100 further includes selective routing relays which comprise a differential relay 121 and a transfer relay 120 for transferring the conductors of line L100 from the fire switchboard line relays to the line circuit equipment LC200 at the police headquarters over line L200. Where it is more economical, the selective routing relays 120 and 121 will be located at the telephone central office and conductors 181 and 182 will be in a cable from the central office to the fire headquarters. The line equipment at police headquarters comprises individual line relay 201, cut-off relay 203, talk relay 204 and a group relay 205 for extending a call from station 100 to the police headquarters switchboard. Fig. 1 further shows alarm equipment which is energized by the release of relay 107 in case the line becomes open.

Figure 3:
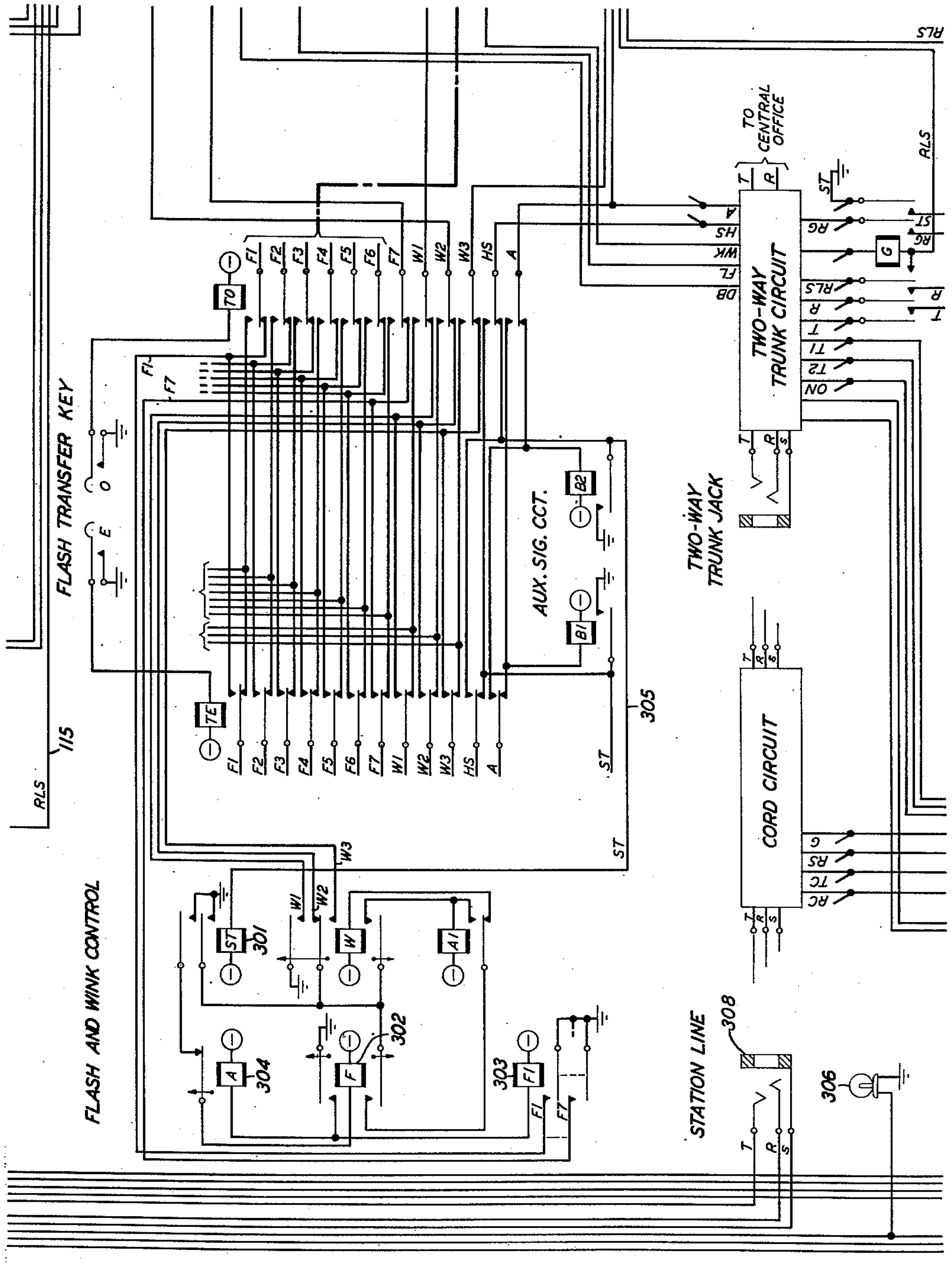
Fig. 3 shows the supervisory flash and wink control and transfer circuits and connections to two-way central office trunks.
Figure 4:
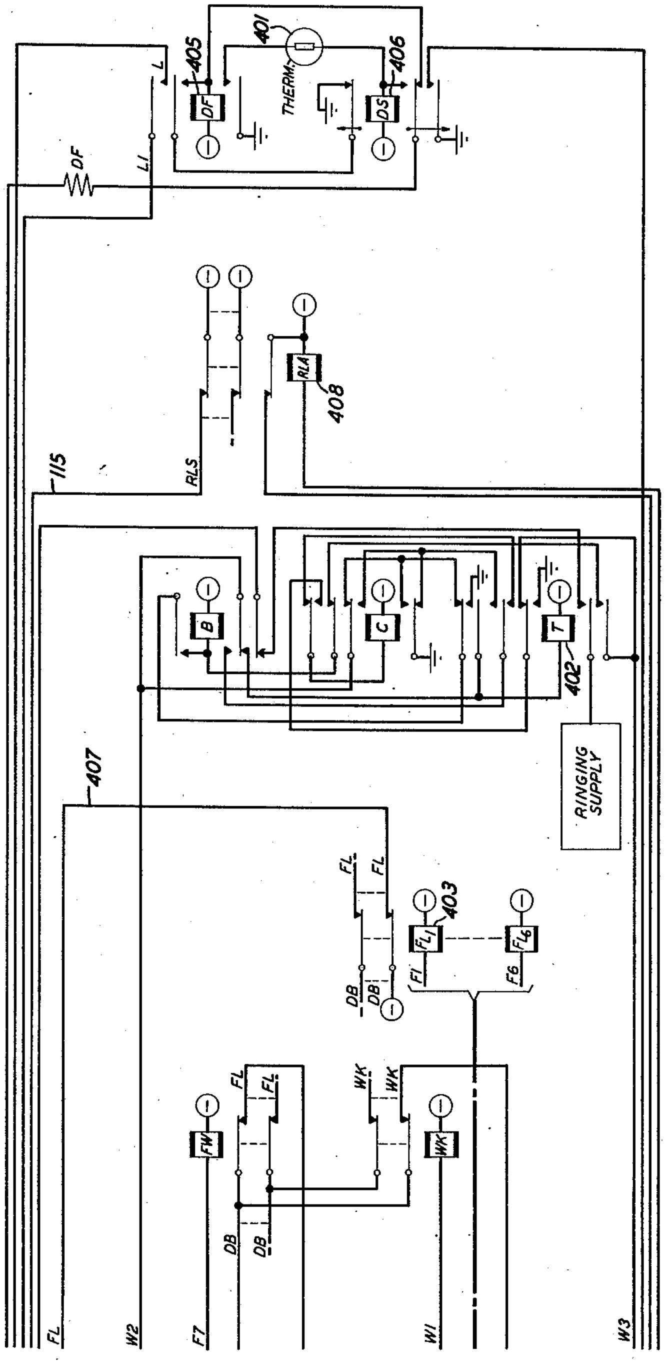
Fig. 4 shows means for distributing flash and wink and other distinctive signals to the various units of equipment and shows timing means for delaying calling signals.
Figure 5:
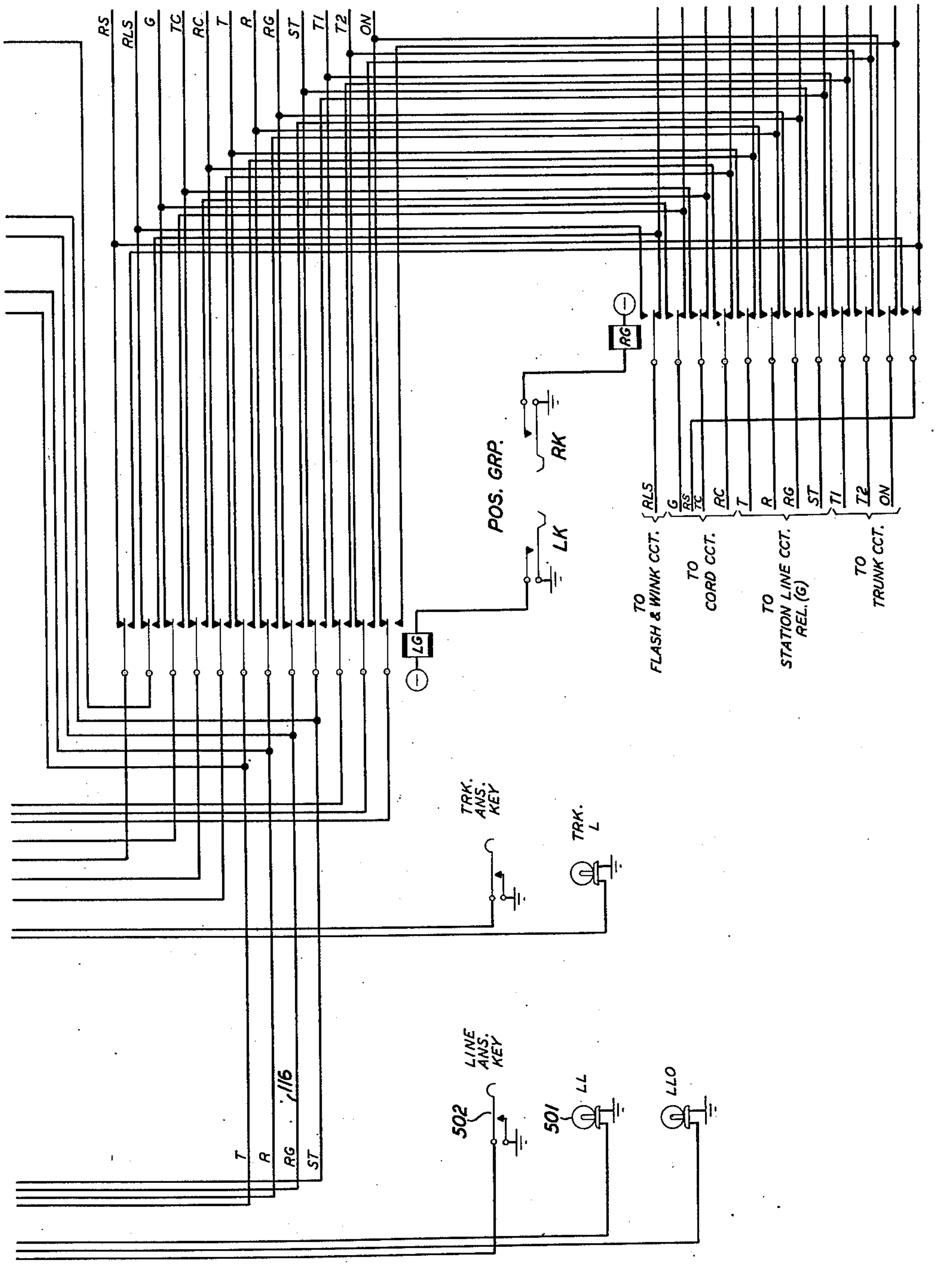
Fig. 5 shows station and trunk lamp and key equipment at an attendant's position and the switchboard grouping equipment.
Figure 6:
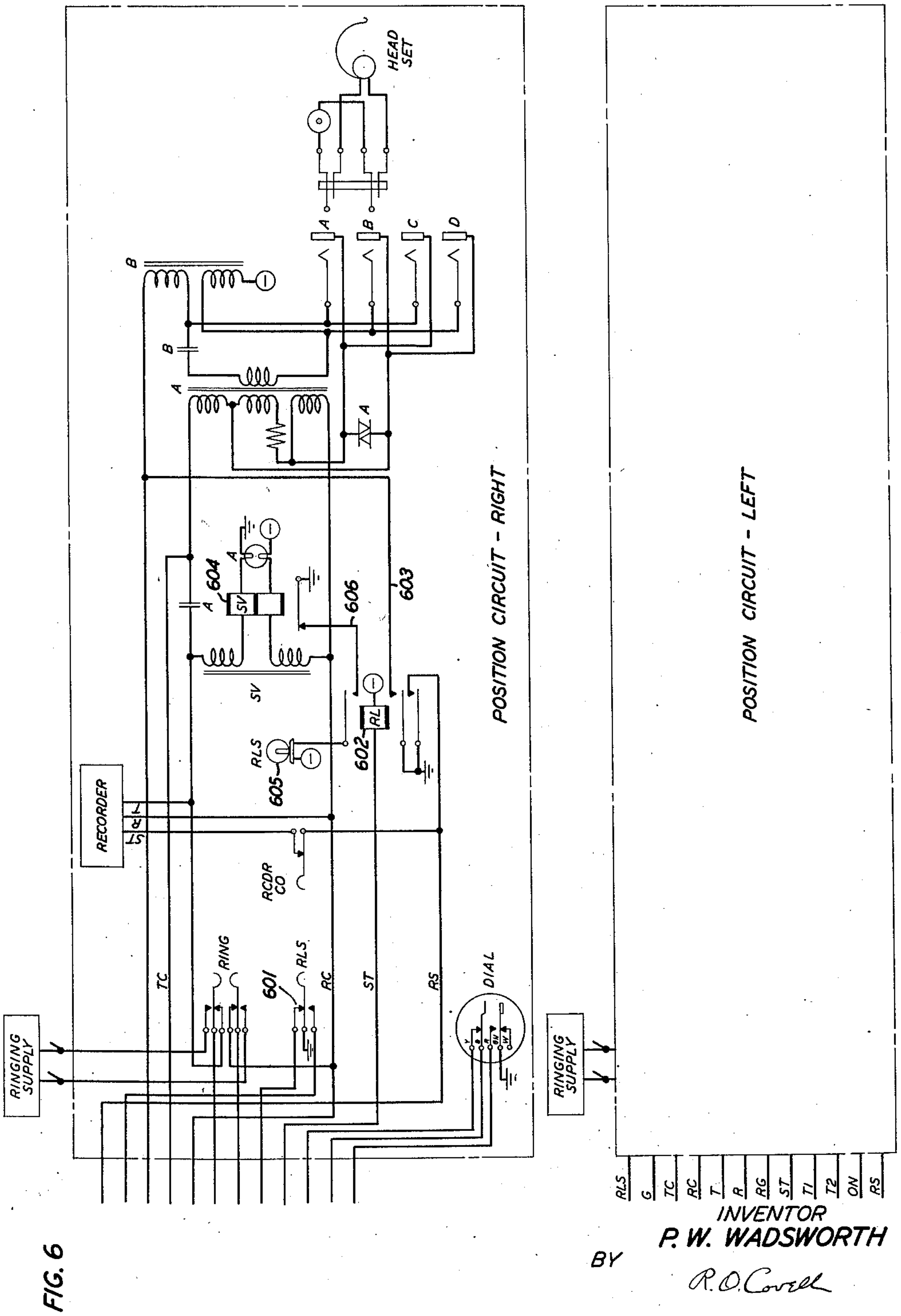
Fig. 6 shows the switchboard position dial and telephone equipment.

Each of the fire and police switchboards, located respectively at fire and police headquarters, comprises a console-type board having two operator positions, as shown schematically in Figs. 5 and 6. Each position is provided with line and trunk answering lamps and keys, and with an attendant's telephone, dial, ringing and recorder equipment. Each station line and central office trunk is jack ended as shown in Fig. 3. Double-ended switchboard cords are provided to answer station or trunk calls and to establish connections between stations and trunks. Groups of lines and trunks normally terminate on either the left or right position of the switchboard, however, the trunks may all be arranged to terminate on either position by operation of the left or right grouping keys. The police switchboard is similar to the fire switchboard except that the line equipment does not include selective routing relays. Duplicate interrupter units are provided as shown in Figs. 3 and 4 for flash and wink control of the line trunk lamps. One unit is normally associated with even-numbered lines and trunks and the other with odd-numbered lines and trunks.

Transfer keys E and O and relays TE and TO enable the association of either unit with all lines and trunks.

This emergency reporting system is, in some respects, similar to a telephone private branch exchange. However, in the reporting system the stations and the switchboard are physically more widely separated and traffic is primarily between the stations and the switchboard, not between the stations. An idle reporting station terminates the station line with a relatively high resistance in series with the transmitter of the telephone. This termination allows enough current to flow in the station loop to hold an alarm relay operated at the location of the switchboard. Therefore, if an open occurs in the wire facilities between the switchboard and a station, or if the transmitter of a station is stolen, the alarm relay will release to give the operator an indication of trouble on a particular station line. Removal of the station from the cradle is effective to give a visual signal to the operator at the fire headquarters. The reporting party may route the call to police headquarters by depressing the nonlocking key before removing the handset. Operation of the key activates the selective routing circuit. The switchboard has features of both a cordless and cord-type switchboard. The operator may answer a call by depressing a nonlocking key, associated with the calling line, or by inserting a cord in the jack of the calling line. The lamp associated with an incoming call flashes with equal on-off intervals until the call is answered and at that time with lamp glows without interruption. Upon completion of the call the operator releases the connection by depressing the position release key in the case of the key answered call or by removing the cord from the line jack.

The operator may originate a call to a station either by operation of station line key and the position ringing key or by inserting a cord into the station line jack followed by the operation of the cord ringing key. In either case, the ringing current is effective to activate bells at the remote station.

The operator has access to the telephone central office over conventional two-way trunk circuits. The connection to the trunk circuit can be either by key or through the switchboard cord circuit. The operator may extend calls from a station line circuit to a telephone central office or vice versa by means of the switchboard cord circuit and the central office two-way trunks.

*Detailed description*

When the station is in the idle condition the line open relay 107 is operated over a path which includes a lower back contact of cut-off relay 103, an upper back contact of transfer relay 120, the left winding of differential relay 121, another upper back contact of relay 120, the tip conductor of the line L100, a back contact of switchhook 10, the transmitter of the station handset 14, resistor 13, the ring conductor of the line, the right winding of relay 121, the lower back contact of relay 120, the upper back contact of the cut-off relay 103 and the winding of the line relay 101 and resistance 102 in parallel to negative battery. Line relay 101 does not operate at this time as the loop current is limited by resistor 13. If the loop circuit described above goes open either due to a line fault, theft of the handset or other equipment failures, the line open relay 107 will release to provide an alarm to the switchboard operator. A ground on the line will also cause relay 107 to release. The release of relay 107 completes an operating path for relay 131 which, in turn, after a short delay, causes time delay relay 132 and the line alarm lamp 133 to operate. It should be noted that during an idle line condition the currents through the windings of the differential relay 121 are equal and opposing, therefore, this relay remains unoperated.

A call to fire headquarters is originated by removing the handset from the switchhook. This reduces the loop resistance by shunting resistor 13 and thereby effects the operation of line relay 101. Again, the currents in the windings of relay 121 are equal and opposite and relay 121 remains unoperated. Operation of relay 101 completes an operating path for delay flash relay 405 by connecting ground to conductor 106, the remainder of the operating path for relay 405 being resistor DF, a lower back contact of delayed seizure relay 406 and the winding of relay 405 to negative battery. Operation of relay 405 provides an operating path for relay 406 which is slow to operate because of thermistor 401 in series with its winding. The operation of relay 405 causes cut-off relay 103 to operate by connecting conductor L to L1 over a pair of upper make contacts. Operation of relay 103 opens the operating paths for relays 101 and 107. Relay 406 operates about .5 of a second after the circuit through its winding is closed, and remains operated for some period after this circuit is opened due to its slow-release characteristics. The operation of relay 406 opens the operating path for relay 405 and the release of relay 405 opens the connection between conductors L and L1 to restore relay 103 to its unoperated position. If the low impedance condition on the loop persists after the release of relay 103, relay 101 will reoperate and relay 406 will be held operated by connection of ground to conductor 106. The delayed seizure circuitry serves to prevent calling signals in case of short intervals of foreign potentials on the station line, as in the case of lightning. The aforementioned operation of relay 406 connects ground through its lower front contact to the A conductor of the auxiliary signaling circuit in Fig. 3 to operate relay B2. The operation of relay B2 connects ground to conductor 305 to operate the start relay 301. The operation of the start relay 301 connects ground to the W2 conductor thereby operating the T relay 402 in Fig. 4 and F relay 302 in Fig. 3. The operation of relay 402 connects central office ringing voltage to the ring conductor of line L100 through condenser LT and the lower front contact of relay 101. This provides ring-back tone to the calling party. The operation of relay 302 causes relays 303 and 304 to operate. Operation of relay 304 effects the release of relay 302 which, in turn, effects the release of relay 304. Upon release of relay 304 relay 302 reoperates and the cycle starts over again. Relay 303 follows the operation of relay 302 and thereby connects interrupted ground to conductors F1 to F7. Relay 303 operates approximately sixty times per minute and has approximately equal periods on and off. The interrupted ground on the conductor F1 causes the flashing lamp relay 403 to operate and release in unison with relay 303, thereby connecting interrupted negative battery to conductor 407 to flash the line lamps 306 and 501, the remainder of the operating path for these lamps being a lower front contact of relay 101, conductor 113 and lamps 306 and 501 in parallel to ground.

The operator may answer this incoming call either by operation of the nonlocking line answer key 502 or by inserting a cord into the station line jack 308. The following description applies to key answering. The operation of key 502 causes relay 104 to operate. The operation of relay 104 completes a circuit for operating group relay 105 through a right front contact of relay 104, winding of relay 105, release conductor 115 and an upper back contact of release relay RLA to negative battery. The inner left front contact of group relay 105 closes a holding path for relay 104, the remainder of this holding path being a left front contact and winding of relay 104, a right front contact of relay 105, conductor 116, back contact of position grouping relay LG and release key 601 to ground. Operation of relay 104 energizes the cut-off relay 103 which opens the operating path for relays 101 and 107, disconnects battery from the back contacts of relay 107 to prevent an alarm indication and connects negative battery to conductor 113 to cause a steady energization of line lamps 306 and 501. The operation of relay 104 and relay 105 completes the talking path from the station line 100 through to the right switchboard position circuit. Operation of relay 105 also connects ground to conductor 117 to operate relay 602. Operation of relay 602 energizes the operator's telephone set by connecting ground to conductor 603 over a lower front contact. Relay 604 operates over the low impedance loop which includes the emergency reporting station circuit. When the handset 14 of the emergency reporting station is replaced on the cradle switch 10 resistor 13 is unshunted and the current in relay 604 is limited below its holding value. Release of relay 604 connects ground to conductor 606 to complete an operating path for supervisory lamp 605. The attendant may release the call by operating release key 601 thereby destroying the previously described holding path for relays 104 and 105. Positive release of relays 104 and 105 is assured as the operation of key 601 removes ground from conductor 116 and also operates relay 408 which removes negative battery over conductor 115.

A call to the police headquarters switchboard is initiated by operating the nonlocking key 11 at the station and thereafter removing the handset 14 from its cradle. Operation of the nonlocking key connects ground to the ring conductor of the line to energize the right winding of differential relay 121 over a path which includes the lower back contact of relay 120, the upper back contact of relay 103 and resistance 102 and relay 101 in parallel to negative battery. This is effective to operate relay 121 which, in turn, energizes relay 120. Operation of relay 120 transfers the line L100 from the station line circuit LC100 at fire headquarters to the station line circuit LC200 at police headquarters over line L200. Operation of relay 120 also reverses the direction of current flow through the left winding of relay 121, therefore, causing the left and right windings to aid each other so that relay 121 remains operated after removal of the handset from the cradle. Removal of the handset connects a low impedance termination across the conductors of the line and causes the operation of the line relay 201 at police headquarters. Operation of relay 201 gives the operator at police headquarters a visual signal and the operator may answer the call either by key or by cord. It should be noted that operation of relay 120 also connects a busy tone source to the tip conductor of the fire department station line circuit LC100 thereby indicating to the attendant at the fire switchboard that the station 100 and the station line L100 are engaged in a call to police headquarters.

A call to the station 100 is originated from a switchboard by closing line answer key 502 to operate relays 104 and 105. This connects the tip and ring of the position circuit to the line and thereafter operation of the ringing key ring of the position circuit transmits ringing current over the station line to operate the ringer 12. Operation of relay 104 closes the previously described circuit for operating the cut-off relay 103. Operation of group relay 105 effects the operation of relay 602 in switchboard position circuit by grounding conductor 117 through a right front contact. The operation of relay 602 energizes lamp 605 and through a lower front contact energizes the operator's telephone set. When the call is answered at the station 100 the loop resistance is reduced by the shunting of resistance 13 and, therefore, relay SV in the switchboard position circuit operates. This extinguishes supervisory lamp 605 to notify the attendant that his call has been answered.

What is claimed is:

1. In a telephone system, first and second operator equipments, a telephone station, a line normally connecting said station to said first equipment, each of said equipments comprising a line relay and calling signaling means energized by operation of the associated line relay, a control relay having windings connected in series with the line relay of the first equipment and in series with said line and said station, a nonlocking key at said station for operating said control relay, and a transfer relay energized by operation of said control relay for transferring said line from the line relay of said first equipment to the line relay of said second equipment.

2. In a telephone system, first and second operator equipments, a telephone station, a line normally connecting said station to said first equipment, said station comprising a resistor normally in series with said line and the telephone transmitter and comprising switchhook means for short-circuiting said resistor and for connecting the telephone to said line, each of said operator equipments comprising a line relay and calling signaling means energized by operation of the associated line relay, a control relay having windings connected in series with the line relay of the first equipment and in series with said line and said resistor, a nonlocking key at said station for operating said control relay, and a transfer relay energized by operation of said control relay for transferring said line from the line relay of said first equipment to the line relay of said second equipment.

3. In a telephone system, first and second operator equipments, a telephone station, a line normally connecting said station to said first equipment, each of said equipments comprising a line relay and calling signaling means energized by operation of the associated line relay, a control relay having windings connected in series with the line relay of the first equipment and in series with said line and said station, a nonlocking key at said station for connecting ground potential to said line to operate said control relay, and a transfer relay energized by operation of said control relay for transferring said line from the line relay of said first equipment to the line relay of said second equipment, and means to prevent false seizure of said line relay.

4. In a telephone system, first and second operator equipments, a telephone station, a line normally connecting said station to said first equipment, each of said equipments comprising a line relay and calling signaling means energized by operation of the associated line relay, a control relay having windings connected in series with the line relay of the first equipment and in series with said line and said station, a nonlocking key at said station for connecting ground potential to said line to operate said control relay, a transfer relay energized by operation of said control relay for transferring said line from the line relay of said first equipment to the line relay of said second equipment, and a normally operated alarm relay in series with said line to indicate a line open circuit condition.

5. In a telephone system, first and second operator equipments, a telephone station, a line normally connecting said station to said first equipment, said station comprising a resistor normally in series with said line and the telephone transmitter and comprising switchhook means for short-circuiting said resistance and for connecting the telephone to said line, each of said equipments comprising a line relay and calling signaling means energized by operation of the associated line relay, a control relay having windings normally differentially connected in series with the line relay of the first equipment and in series with said line and said resistor, a nonlocking key at said station for connecting ground potential to said line to operate said control relay, a transfer relay energized by operation of said control relay for transferring said line from the line relay of said first equipment to the line relay of said second equipment, means to prevent false seizure of said line relay, and a normally operated alarm relay in series with said line to indicate a line open circuit condition.

6. In a telephone system, a telephone station, first and second line relay equipments, a line normally connecting said station and said first line relay equipment, first and second calling signal means responsive to the operation of the associated line relay, a control relay having windings connected in series with the first line relay and in series with said line and said station, a nonlocking key at said station for operating said control relay, a transfer relay energized by operation of said control relay for transferring said line from said first line relay equipment to said second line relay equipment, first and second operator telephone sets, first and second telephone switchboards comprising answering keys individual to said telephone stations for effecting a transmission path between said station and said operator telephone sets, and first and second release keys for releasing the connection between said station and said telephone operator set.

7. In a telephone system, a telephone station, first and second line relay equipments, a line normally connecting said station and said first line relay equipment, said station comprising a resistor normally in series with said line and the telephone transmitter and comprising switchhook means for short-circuiting said resistance and for connecting the telephone to said line, first and second calling signal means responsive to the operation of the associated line relay, a control relay having windings normally connected in series with the first line relay and in series with said line and said resistor, a nonlocking key at said station for operating said control relay, a transfer relay energized by operation of said control relay for transferring said line from said first line relay equipment to said second line relay equipment, first and second operator telephone sets, first and second telephone switchboards comprising an answering key individual to said telephone station for effecting a transmission path between said station and said operator telephone sets and a release key for releasing the connection between said station and said telephone operator set, and a normally operated alarm relay to indicate a line open circuit condition.

8. In a telephone system, a telephone station, first and second line relay equipments, a line connecting said station and said first line relay equipment, first and second calling signal means responsive to the operation of the associated line relay, a control relay having windings normally differentially connected in series with the first line relay and in series with said line and said station, a nonlocking key at said station for connecting ground potential to said line to operate said control relay, a transfer relay energized by operation of said control relay for transferring said line from said first line relay equipment to said second line relay equipment, first and second operator telephone sets, first and second operator telephone switchboards comprising an answering key individual to said telephone station for effecting a transmission path between said station and said operator telephone sets and a release key for releasing the connection between said station and said telephone operator set, means to prevent false seizure of said line relay and a normally operated alarm relay in series with said line to indicate a line open circuit condition.

9. In a telephone system, a telephone station, first and second line relay equipments, a line normally connecting said station and said first line relay equipment, said station comprising a resistor normally in series with said line and the telephone transmitter and comprising switchhook means for short-circuiting said resistance and for connecting the telephone to said line, first and second calling signal means responsive to the operation of the associated line relay, a control relay having windings normally differentially connected in series with the first line relay and in series with said line and said resistor, a nonlocking key at each station for connecting ground potential to said line to operate said control relay, a transfer relay energized by operation of said control relay for transferring said line from said first line relay equipment to said second line relay equipment, first and second operator telephone sets, first and second telephone switchboards comprising an answering key individual to said telephone station for effecting a transmission path between said station and said operator telephone sets, and a release key for releasing the connection between said station and said telephone operator set, means to prevent false seizure of said line relay, and a normally operated alarm relay in series with said line to indicate a line open circuit condition.

No references cited.